(12) United States Patent
Kreutz et al.

(10) Patent No.: US 12,139,188 B2
(45) Date of Patent: Nov. 12, 2024

(54) POSITION DETECTION FOR A STEERING COLUMN OF A MOTOR VEHICLE

(71) Applicants: thyssenkrupp Presta AG, Eschen (LI); thyssenkrupp AG, Essen (DE)

(72) Inventors: Daniel Kreutz, Feldkirch (AT); Sedat Sen, Heerbrugg (CH); Andreas Willi, Lauterach (AT); Christian Pichonnat, Indianapolis, IN (US); Thomas Geiselberger, St. Gallen (CH); Justin Yoho, Westfield, IN (US)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 827 days.

(21) Appl. No.: 17/250,488

(22) PCT Filed: Jul. 26, 2019

(86) PCT No.: PCT/EP2019/070145
§ 371 (c)(1),
(2) Date: Jan. 27, 2021

(87) PCT Pub. No.: WO2020/025466
PCT Pub. Date: Feb. 6, 2020

(65) Prior Publication Data
US 2021/0291890 A1 Sep. 23, 2021

(30) Foreign Application Priority Data

Jul. 31, 2018 (DE) .......................... 102018118506.5
Apr. 1, 2019 (DE) .......................... 102019108466.0

(51) Int. Cl.
*B62D 1/181* (2006.01)
*B60R 21/01* (2006.01)
(Continued)

(52) U.S. Cl.
CPC .............. *B62D 1/181* (2013.01); *B60R 21/01* (2013.01); *B60R 21/203* (2013.01); *B62D 1/185* (2013.01);
(Continued)

(58) Field of Classification Search
CPC ........ B62D 1/181; B62D 1/185; B62D 1/192; B60R 21/01; B60R 21/203; B60R 2021/01252; G01D 5/20; G05D 1/0061
See application file for complete search history.

(56) References Cited

U.S. PATENT DOCUMENTS 4,661,752 A * 4/1987 Nishikawa ............. B62D 1/181
318/434
5,419,215 A 5/1995 Herron
(Continued)

FOREIGN PATENT DOCUMENTS

CN 104943646 A 9/2015
DE 199 62 494 A 7/2000
(Continued)

OTHER PUBLICATIONS

English Translation of International Search Report issued in PCT/EP2019/070145, dated Nov. 5, 2019.

*Primary Examiner* — Tyler J Lee
*Assistant Examiner* — Kimia Kohankhaki
(74) *Attorney, Agent, or Firm* — thyssenkrupp North America, LLC

(57) ABSTRACT

A steering column for a motor vehicle includes comprising a supporting unit which can be connected to the chassis of the motor vehicle and an actuating unit, which is mounted on the supporting unit and which supports a steering shaft for rotation. The position of the actuating unit can be adjusted in relation to the supporting unit and the steering column has
(Continued)

a position detection device for determining the position of the actuating unit relative to the supporting unit.

11 Claims, 4 Drawing Sheets

(51) Int. Cl.
*B60R 21/203* (2006.01)
*B62D 1/185* (2006.01)
*B62D 1/19* (2006.01)
*G01D 5/20* (2006.01)
*G05D 1/00* (2024.01)

(52) U.S. Cl.
CPC ............ *B62D 1/192* (2013.01); *G01D 5/20* (2013.01); *G05D 1/0061* (2013.01)

(56) References Cited

U.S. PATENT DOCUMENTS

| | | |
|---|---|---|
| 6,749,222 B2 | 6/2004 | Manwaring |
| 2002/0124677 A1* | 9/2002 | Tomaru .................. B62D 1/181 280/775 |
| 2002/0167157 A1 | 11/2002 | Matsumoto |
| 2006/0043721 A1 | 3/2006 | Ridgway |
| 2013/0054094 A1 | 2/2013 | Elsensohn |
| 2015/0274106 A1 | 10/2015 | Lorenz et al. |
| 2016/0304125 A1* | 10/2016 | Füßl .................... B62D 15/0225 |
| 2016/0375927 A1* | 12/2016 | Schulz ................ B60R 21/2338 280/775 |
| 2018/0086378 A1 | 3/2018 | Bell |
| 2018/0312193 A1* | 11/2018 | Arnold ..................... B62D 1/02 |

FOREIGN PATENT DOCUMENTS

| | | |
|---|---|---|
| DE | 10 2004 044 472 A | 3/2006 |
| DE | 602 24 895 T | 1/2009 |
| DE | 10 2010 020 087 A | 11/2011 |
| DE | 10 2017 207 561 A | 7/2017 |
| EP | 1 632 418 A | 3/2006 |
| WO | 92/16403 A | 10/1992 |
| WO | 2018/202672 A | 11/2018 |

* cited by examiner

POSITION DETECTION FOR A STEERING COLUMN OF A MOTOR VEHICLE

CROSS REFERENCE TO RELATED APPLICATIONS

This application is a U.S. National Stage Entry of International Patent Application Serial Number PCT/EP2019/070145, filed Jul. 26, 2019, which claims priority to German Patent Application No. DE 10 2019 108 466.0, filed Apr. 1, 2019, and German Patent Application No. DE 10 2018 118 506.5, filed Jul. 31, 2018, the entire contents of which are incorporated herein by reference.

FIELD

The present disclosure generally relates to a steering column for a motor vehicle.

BACKGROUND

The steering columns installed in motor vehicles are mostly adjustable, wherein it may be provided that the steering column can be adjusted by motor. For future highly automated vehicles that can be driven manually and autonomously, a steering column with a large adjustment path offers the advantage that the steering wheel can be moved away by the driver in autonomous mode. This gives the driver more space for other activities. In order to protect the driver in both driving conditions, a specific airbag system is required, which optimally protects the driver in both cases with the steering wheel retracted and extended. There are approaches for this, in which different airbag systems are "activated" depending on the steering wheel position. In order to activate specific airbag systems for the different steering wheel positions, the vehicle must know the position of the steering wheel or steering column at all times. This means for the steering column that at least the longitudinal adjustment position must be reliably detected and sent to the vehicle. Due to the safety-dependent function, the position detection comes under the classification of functional safety (ASIL). The steering wheel position is conventionally detected from the rotation of the rotor of the motor of the drive unit of the adjustment drive and must be re-learned after each loss of voltage. This is a safety problem.

From the prior art, i.e. the disclosure document US 2018/086378 A1, a steering column with position detection is known, in which the adjustment position of the actuating unit relative to the supporting unit can be determined by means of a separate transmission.

The disclosure document DE 10 2004 044 472 A1 reveals a motor-adjustable steering column, which has a magnetic sensor system, which has a first element on the adjustable part of the steering column and a second stationary element interacting with it, wherein the two elements of the sensor system only produce a sensor signal within the adjustment path of the steering column, which allows operation of the adjustment drive. On approaching the mechanical end stops of the steering column, a second signal is produced, which deactivates the actuator.

Thus, a need exists for a steering column for a motor vehicle with a reliable position detection device and a method for operating such a steering column.

DETAILED DESCRIPTION

Figure 1:
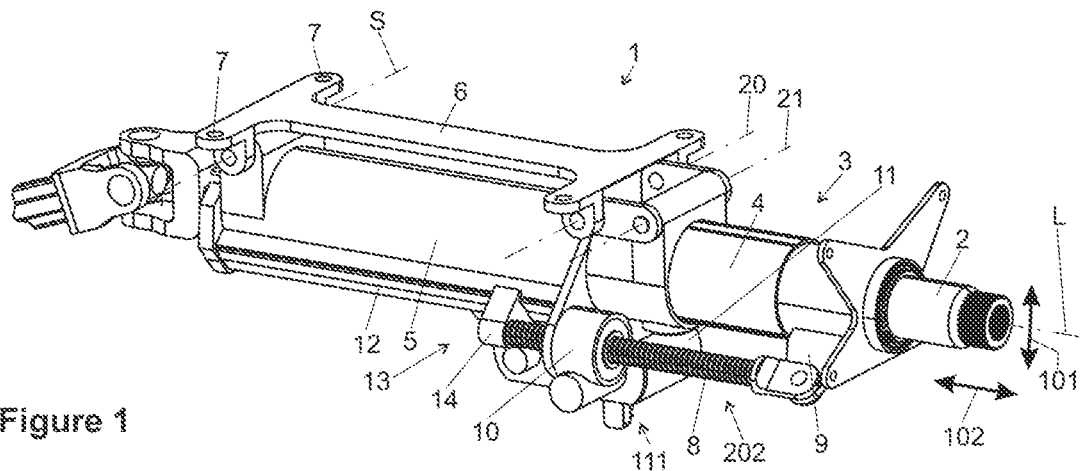
FIG. 1 is a perspective view of a steering column for a steering system of a motor vehicle in an extended position.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to a steering column for a motor vehicle and a method for operating a steering column.

Accordingly, a steering column is provided for a motor vehicle, comprising a supporting unit which can be connected to the chassis of the motor vehicle and an actuating unit, which is mounted on the supporting unit and which supports a steering shaft for rotation, wherein the actuating unit can be adjusted relative to the supporting unit, and wherein the steering column has a position detection device for determining the position of the actuating unit relative to the supporting unit.

Position detection is performed in a simple and cost-effective way, which makes it possible to implement effective measures to increase safety. The position detection device thus offers the possibility to determine the relative local position of the actuating unit relative to the supporting unit.

Therefore, it is irrelevant whether the adjustment between the actuating unit and the supporting unit is done manually, mechanically, pneumatically, hydraulically, or electrically.

Preferably, the actuating unit can be adjusted relative to the supporting unit along an adjustment path.

Preferably, the actuating unit can be adjusted in a length adjustment direction along a first adjustment path of the steering column and/or in a height adjustment direction along a second adjustment path of the steering column. Preferably, the position detection device has at least one position sensor unit, which has a first element and a cooperating second element, wherein the first element moves relative to the second element when adjusting the actuating unit relative to the supporting unit.

Preferably, the position detection device may comprise a control unit, which further processes the electrical signals of the position sensor unit and determines the position of the actuating unit relative to the supporting unit. Preferably, the at least one position sensor unit detects the adjustment along the first and/or second adjustment path continuously over at least 80% of the corresponding adjustment path.

Preferably, the adjustment of the actuating unit relative to the supporting unit is continuously detected along the adjustment path by the at least one position sensor unit. Thus, not only as in the prior art, the determination of individual positions of the actuating unit takes place, such as the end positions, but the position, i.e. the exact location of the actuating unit relative to the supporting unit, can be determined over the entire adjustment path of the actuating unit relative to the supporting unit.

In a preferred embodiment, the steering column has an adjustment drive for adjustment in the length adjustment direction and/or an adjustment drive for adjustment in the height adjustment direction. In an advantageous development, the adjustment drive comprises an electric motor and a threaded rod with an external thread, which engages an internal thread of a spindle nut of the adjustment drive. It may be provided that the threaded rod can be rotationally driven by the electric motor, wherein the spindle nut is rotationally fixedly coupled to the supporting unit or the actuating unit, wherein the spindle nut is shifted translationally relative to the threaded rod by the rotation of the threaded rod. Alternatively, it may be provided that the spindle nut is rotationally driven by the electric motor, wherein the threaded rod is rotationally fixedly coupled to the supporting unit or the actuating unit, wherein the threaded rod is shifted translationally relative to the spindle nut by the rotation of the spindle nut. The adjustment is realized due to this displacement of the spindle nut relative to the threaded spindle. In this case, it is preferred if the second element of the at least one position sensor unit is attached to the threaded rod and the first element is held stationary relative to the spindle nut, so that the at least one position sensor unit determines the position of the spindle nut on the threaded rod. From this information, the position of the actuating unit relative to the supporting unit can then be calculated. The calculation can preferably be performed by means of the control unit.

Preferably, the second element can be formed by the threaded rod.

Preferably, the first element and the second element of the at least one position sensor unit are linearly movably guided relative to each other. The displacement, i.e. the displacement of the first element relative to the second element, is purely translational. In other words, the displacement occurs only along one degree of freedom, wherein movement along the other two translational degrees of freedom and the three rotatory degrees of freedom is blocked.

The position sensor unit preferably comprises a sensor in which the first element is guided exclusively to glide past the second element. Thus, neither the first element nor the second element has rotating parts that are engaged with each other.

The position sensor unit preferably includes a contactless sensor. The first element and the second element are not mechanically engaged with each other. Preferably, neither the first element nor the second element has rotating parts that are engaged with each other.

The contactless sensor preferably comprises electronic semiconductors, which produce an energy-rich field or a beam, wherein this is performed, for example, by one of the two elements, wherein the other of the two elements detects a disturbance within the field or the beam.

In a particular and preferred embodiment, the first element and the second element are at a distance apart from each other, wherein this distance is greater than zero. In other words, the first element is not in contact with the second element. However, it may be provided that the first element and the second element have a mechanical guide that guides the first element relative to the second element. This guidance may well involve mutual contact without departing from the concept of a contactless sensor in the sense of the invention.

Compared to the prior art, the contactless sensor has the advantage that no movable parts that can block, wear or break are required, thereby increasing the service life and at the same time reducing costs. Furthermore, the measuring accuracy can be increased, wherein this is accompanied by an increase in reliability.

In an advantageous embodiment, the position sensor unit has a linear sensor for producing an electrical control signal depending on the relative position of the first element relative to the second element.

The sensor is preferably designed as an absolute sensor. The absolute sensor offers the advantage that after resumed operation, for example after a deenergized situation, no reference data are required and thus no calibration movement is required, for example between the end positions, in order to resume operation successfully.

The sensor can be an inductive, magnetic, optical, acoustic, or capacitive sensor.

The position sensor unit may be located on the outside or the inside of the actuating unit.

The actuating unit of the steering column preferably has an outer sleeve, on which the steering shaft is rotatably supported.

In an advantageous embodiment, the position detection device is designed as a redundant system, which has two independent position sensor units for measuring the position of the actuating unit relative to the supporting unit. The two redundant position sensor units preferably have different measurement methods. Thanks to the redundant arrangement or the different measurement methods, reliability can be further increased.

It is advantageous if the steering column has a position sensor unit for determining the longitudinal adjustment position and/or a position sensor units for determining the height adjustment position.

Preferably, the steering column has a motorized adjustment drive for adjustment in the length adjustment direction and/or the height adjustment direction.

It is advantageous if the steering column has a first adjustment drive for the longitudinal adjustment and a second adjustment drive for the height adjustment.

In an advantageous embodiment, in the length adjustment device the second element of the position sensor unit is attached to one end of the threaded rod and the first element is attached to the outer sleeve. Generally speaking, for axial adjustment the first element is preferably located on a stationary component and the second element on a moving component.

It is advantageous if the second element has a metallic component and the first element has a flat coil extending parallel to the longitudinal axis on the outer side of the outer sleeve, wherein a continuous change of the inductance can be measured by moving the second element past the flat coil.

It may further be provided that in the height adjustment device the second element of the position detection device is arranged on the threaded rod and the first element of the position detection device is arranged on the housing of the adjustment drive, which is stationary relative to the spindle nut. Generally speaking, for height adjustment the first element is preferably located on a stationary component and the second element is located on a moving component. Basically, it is also conceivable and possible that the first element is arranged on the moving component and the second element on the stationary component.

The position detection device according to the invention can also be used in manually adjustable steering columns, wherein such a manually adjustable steering column has a fixing device, which can be switched between a release position, in which the actuating unit can be adjusted relative to the supporting unit, and a fixing position, in which the actuating unit is fixed relative to the supporting unit.

Furthermore, a method is provided for operating a steering column comprising a supporting unit that can be connected to the chassis of the motor vehicle and an actuating unit, which is mounted on this supporting unit and which supports a steering shaft for rotation, wherein the actuating unit can be adjusted relative to the supporting unit by means of a motorized adjustment drive, and wherein the steering column has a position detection device for determining the position of the actuating unit relative to the supporting unit and the method has the following steps:
  determining a position of the actuating unit relative to the supporting unit by means of the position detection device;
  calculating an adjustment speed from the determined position signal; and
  stopping the adjustment of the steering column if the adjustment speed falls below a predetermined limit value.

Preferably, the steering column comprises a control unit. This control unit cooperates with the position detection device and is designed to perform the method according to the invention.

Preferably, the actuating unit can be adjusted relative to the supporting unit in a length adjustment direction along a first adjustment path of the steering column by means of a first motorized adjustment drive and/or in a height adjustment direction along a second adjustment path of the steering column by means of a second motorized adjustment drive.

Preferably, an adjustment speed can be calculated from the determined position signal in the length adjustment direction and an adjustment speed can be calculated from the determined position signal in the height adjustment direction. Alternatively or additionally, it is conceivable and possible to determine a total adjustment speed by means of the superposition principle.

The method allows the detection of a blockage or a collision of the adjustment device or the actuating unit with simple means.

The method may include the following further procedure steps:
  determining an energization of the first and/or second adjustment-drives,
  checking whether a predetermined limit of the energization is exceeded,
  if the limit value is exceeded, stopping the adjustment of the steering column.

The determination of the energization can preferably be understood to mean the determination of the electrical current by means of an amperemeter.

This is another way to detect the blocking of the adjustment or a collision.

Furthermore, a method is provided for operating a steering column comprising a supporting unit that can be connected to the chassis of the motor vehicle and an actuating unit, which is mounted on the supporting unit and which supports a steering shaft for rotation, wherein the actuating unit can be adjusted relative to the supporting unit, and the steering column has a position detection device for determining the position of the actuating unit relative to the supporting unit and a crash system with at least two energy absorption devices arranged on the steering column, wherein the method comprises the following procedure steps:
  determining a position of the actuating unit relative to the supporting unit by means of the position detection device in the event of a crash;
  Controlling the at least two energy absorption devices arranged on the steering column depending on the determined position, wherein at least one of the energy absorption devices is put into operation.

Preferably, the steering column comprises a control unit. This control unit cooperates with the position detection device and is designed to perform the method according to the invention.

Preferably, the actuating unit can be adjusted relative to the supporting unit in the length adjustment direction along a first adjustment path of the steering column by means of a first motorized adjustment drive and/or in the height adjustment direction along a second adjustment path of the steering column by means of a second motorized adjustment drive.

Preferably, an adjustment speed can be calculated or determined from the determined position signal in the length adjustment direction and an adjustment speed can be calculated or determined from the determined position signal in the height adjustment direction. Alternatively or additionally, it is conceivable and possible to determine a total adjustment speed by means of the superposition principle.

The energy absorption devices can thus be adapted to the position of the steering shaft, which significantly improves the energy absorption effectiveness.

Preferably, the energy absorption devices are arranged between the supporting unit and the actuating unit and/or between the supporting unit and the chassis of the vehicle.

Preferably, each energy absorption device comprises an energy absorption element, which is plastically deformed during the operation of the respective energy absorption device.

As an energy absorption element, for example, the following elements can be used: a bending wire, a bending strip, a bending strap, a bending tear strap, a strip that is moved through a deformation organ or an elongated hole which is widened by a deformation organ. Such energy absorption elements are sufficiently known to the skilled person from the prior art and are therefore not further elaborated at this point. Also, the above list is not exhaustive, but merely an example list of possible embodiments.

Preferably, the steering column has a pyro switch or a lifting magnet for activating the at least two energy absorption devices. By switching the pyro switch or the lifting magnet, the energy absorption devices are put into operation.

In addition, a method is provided for operating a steering column comprising a supporting unit that can be connected to the chassis of the motor vehicle and an actuating unit, which is mounted on the supporting unit and which supports a steering shaft for rotation, wherein the actuating unit can be adjusted relative to the supporting unit, wherein the steering column can be stowed, and wherein the steering column has a position detection device for determining the position of the actuating unit relative to the supporting unit and a crash system with an airbag system, and the method comprises the following procedure steps:

determining a position of the actuating unit relative to the supporting unit by means of the position detection device in the event of a crash;

controlling the airbag system depending on the determined position.

Preferably, the steering column comprises a control unit. This control unit cooperates with the position detection device and is designed to perform the method according to the invention.

Preferably, the actuating unit can be adjusted relative to the supporting unit in the length adjustment direction along a first adjustment path of the steering column by means of a first motorized adjustment drive and/or in the height adjustment direction along a second adjustment path of the steering column by means of a second motorized adjustment drive.

Preferably, an adjustment speed in the length adjustment direction can be calculated or determined from the determined position signal and an adjustment speed in the height adjustment direction can be calculated or determined from the determined position signal. Alternatively or additionally, it is conceivable and possible to determine a total adjustment speed by means of the superposition principle.

The airbag system can thus be controlled adopted to the position of the steering column, which provides even better protection for the driver in the event of a crash. A stowable steering column can be adjusted between an extended position in which the driver is controlling the vehicle, i.e. the motor vehicle is controlled manually, and a retracted position in which the motor vehicle is autonomously controlled without intervention by the driver.

Preferably, the airbag system is designed to protect a driver in the event of a crash in an autonomous driving mode with a stowed steering column and in a manual or semi-autonomous driving mode, wherein the method includes the following further steps:

detecting that the steering column is stowed;

controlling the airbag system according to the stowed steering column.

The methods described above preferably comprise the previously described position detection device.

Figure 2:
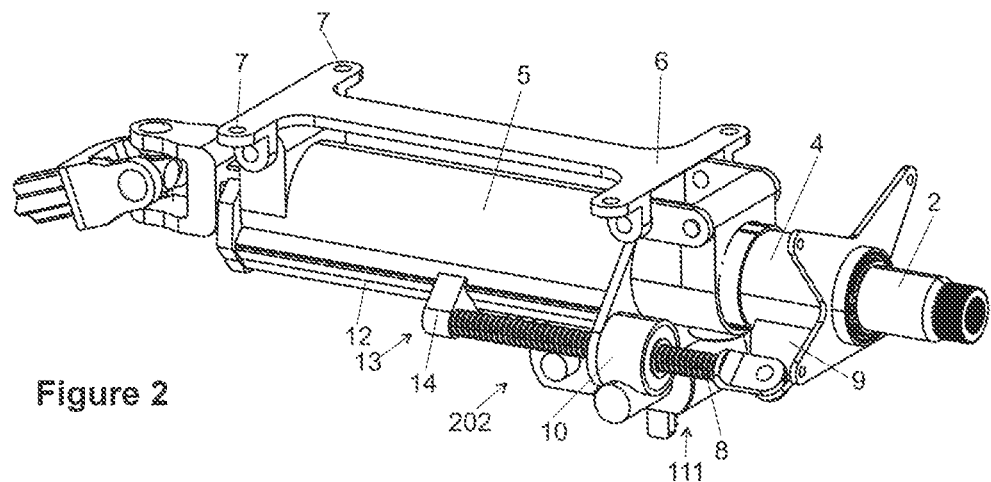
FIG. 2 is a perspective view of the steering column from FIG. 1 in a retracted position.
Figure 3:
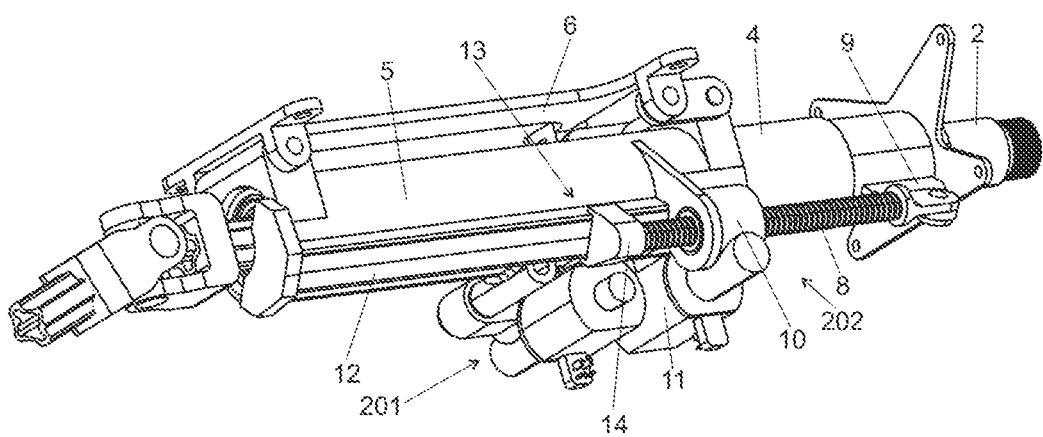
FIG. 3 is a second perspective view of the steering column from FIG. 1.

FIGS. 1 to 3 illustrate a steering column 1 for a motor vehicle having a steering shaft 2 which is mounted rotatably around its longitudinal axis L, which is also referred to as the rotational axis, in a steering shaft bearing unit 3 having an inner sleeve 4. The inner sleeve 4 is movably guided in an outer sleeve 5 along the longitudinal axis L of the steering shaft 2. The outer sleeve 5 is mounted pivotably around a pivot axis S in a retaining part 6. The retaining part 6 can be fixed at fastening points 7 to the body, which is not shown and which corresponds to the chassis of the motor vehicle. At a rear end, the steering shaft 2 can be connected to the steering wheel, which is not shown. The rotational movement introduced into the steering shaft by a driver via the steering wheel is introduced into the steering gear, which is not shown, via a gimbal joint provided at the other end, i.e. the front end, and other steering shaft parts. Alternatively, the front end may also be coupled to a manual torque actuator, for example in a steer-by-wire steering system, wherein no mechanical coupling is provided between the steering wheel and the steerable wheels of the vehicle. In order to increase the comfort of the driver, the steering column 1 can be adjusted in its height in the adjustment direction 101 and in its length in the adjustment direction 102. For this purpose, the steering column 1 has a height adjustment device 201 and a length adjustment device 202, each of which comprises an adjustment drive. The adjustment drives each have an electric motor with a threaded rod drive, also referred to as a spindle drive, which has a worm shaft arranged on the output of the electric motor, wherein the worm shaft engages a worm wheel. The worm wheel is either rotationally fixedly connected to the threaded rod (known as a rotation spindle drive or also a rotary spindle drive) or is rotationally fixedly coupled to a spindle nut (immersion spindle drive). These adjustment drive concepts are sufficiently known to the skilled person from the prior art, for example the disclosure in DE 10 2017 207 561 A1 concerning the adjustment drives is pointed out here.

FIGS. 1 to 3 show the adjustment drive 111 in the longitudinal direction 102. The threaded rod 8 is connected via a coupling lever 9 to the inner sleeve 4, so that a displacement of the coupling lever 9 relative to the outer sleeve 5 leads to a displacement of the inner sleeve 4 relative the outer sleeve 5. The threaded rod 8 is rotationally fixedly mounted on the coupling lever 9 and extends in the length adjustment direction 102. The threaded rod 8, which is in the form of a threaded spindle, engages a spindle nut, which is rotatably mounted in a housing 10 of the adjustment drive and is in a fixed position. The spindle nut is formed on its outside as a worm wheel, and the toothing thereof is engaged by the worm shaft arranged on the output shaft of an electric motor 11. By rotation of the stationary spindle nut, the threaded rod 8 is moved axially, whereby the inner sleeve 4 is displaced relative to the outer sleeve 5. The adjustment drive 111 is designed as an immersion spindle drive. FIGS. 1 and 3 show the extended position of the length adjustment device 202 and the retracted position is shown in FIG. 2.

To determine the position of the steering column or the position of the steering wheel, a first element 12 of a position sensor unit 13 is attached to the outer sleeve 5. This element 12 of the position sensor unit 13 extends in the longitudinal direction L preferably over the entire adjustment path of the threaded rod 8, in particular the entire length of the outer sleeve 5. Since the threaded rod 8 of the length adjustment device 202 does not rotate, a second element 14 of the position sensor unit 13 is attached to the end of the threaded rod 8 remote from the coupling lever.

The position sensor unit 13 is preferably designed so that the second element 14 moves synchronously with the inner sleeve 4 and the first element 12 is fixed to the outer sleeve 5 in a fixed position. The two relatively movable elements 12, 14 are preferably part of a linear sensor, which produces an electrical signal depending on the relative position. In this embodiment variant, the outer sleeve 5 forms the supporting unit and the inner sleeve 4 forms the actuating unit.

The first element 12 is preferably a sensor, over which the second element 14 moves in the axial direction. The second element 14 may be formed at least partially of a metallic material. The sensor 12 detects the movement of the second element 14 and determines preferably the absolute position, so that even after a voltage drop the position signal is still available. The sensor preferably comprises an inductive linear sensor with a flat coil. A circuit board with measuring electronics with a flat measuring coil is attached to the component (outer sleeve 5 as supporting unit), which is stationary fixed during axial adjustment. There is a metallic component on the component (inner sleeve 4 as the actuating unit) which is movable during axial adjustment. This metallic component moves over the area of the flat coil during adjustment and creates a change in inductance. This dependency is used to conclude the position of the adjustable component. Furthermore, a control unit can be provided which processes the signals of the sensor and calculates the corresponding position, which is then output as an output value and is forwarded, for example, to further control units or vehicle assistance systems.

Figure 4:
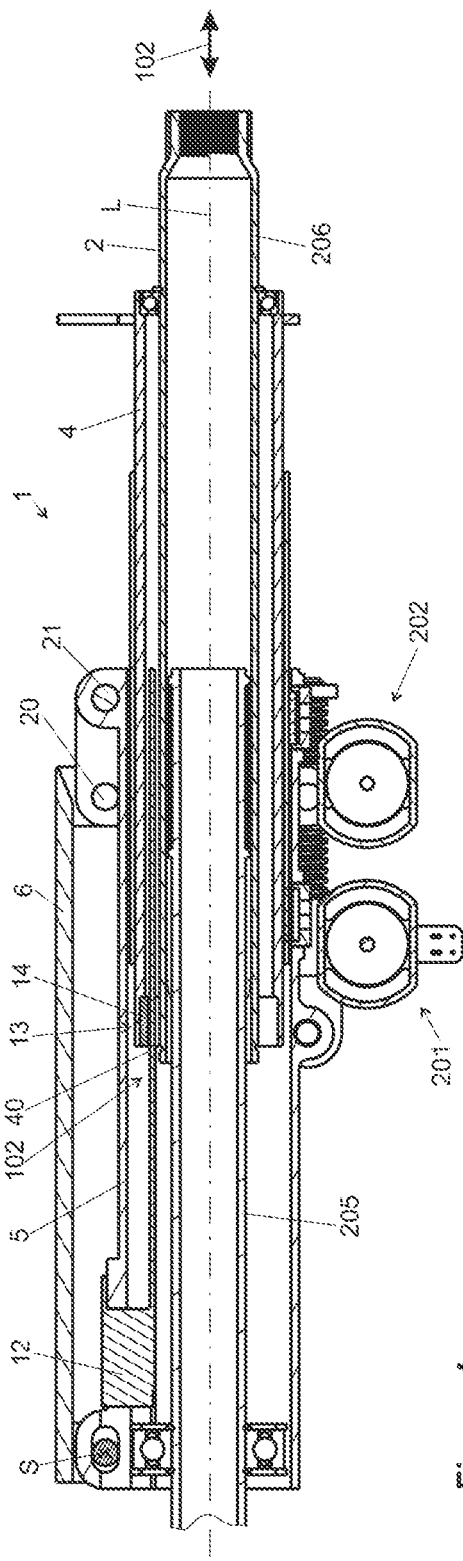
FIG. 4 is a longitudinal section through a steering column with an internal position sensor unit.

FIG. 4 shows a position sensor unit for a length adjustment direction 102 which is arranged inside the steering column 1 or more precisely in the interior of the outer sleeve 5. The inner sleeve 4 is telescopically accommodated in the outer sleeve 5. The steering shaft 2 is of telescopic form and in addition to an inner shaft 205 has an outer shaft 206, which partially coaxially surrounds the inner shaft 205. The profile of the outer shaft 206 is complementary to a recess of the inner shaft 205 and allows torque transmission. A first element 12 of the position sensor unit 13, which is stationary fixed during the length adjustment, is positioned between the inner sleeve 4 and the outer shaft 206. The first, fixed element 12 extends in the longitudinal direction preferably over the adjustment path of the length adjustment, and, in particular, over at least 50% of the length of the outer sleeve, preferably, over at least 80% and, most preferably, over the entire adjustment path. A second, longitudinally movable element 14 is attached to the inner sleeve 4. During adjustment in the longitudinal direction in the direction of the longitudinal axis L, the second movable element 14 of the position sensor unit 13 moves past the first element 12 in parallel to the longitudinal axis. Preferably, the second movable element 14 is arranged on an inner side of the inner sleeve 4, in particular at an internal end 40. In this embodiment of FIG. 4, the outer sleeve 5 forms the supporting unit and the inner sleeve 4 forms the actuating unit.

Figure 5:
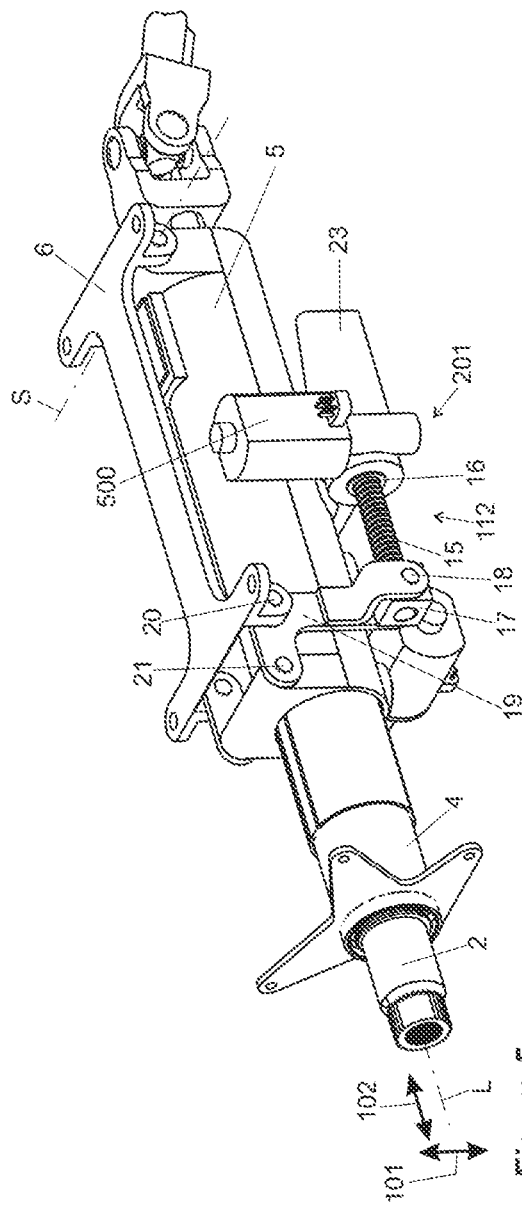
FIG. 5 is a perspective view of a steering column with a height adjustment drive and a position sensor unit.

FIG. 5 shows a height adjustment device 201 with an adjustment drive 112. An electric motor 500 of the adjustment drive 112 drives the adjustment movement of the outer sleeve 5 in the height adjustment direction 101 relative to the retaining part 6 in the form of a console. A threaded rod 15 in the form of a threaded spindle engages a spindle nut 16, wherein the spindle nut 16 is formed as a worm wheel on its outside, and the toothing thereof is engaged by a worm shaft arranged on the output shaft of the electric motor 500. The spindle nut 16 is set rotating by the rotation of the worm wheel. The threaded rod 15 engages the spindle nut 16, wherein the threaded spindle 15 is moved translationally relative to the spindle nut 16 by the rotation of the spindle nut 16 due to the corresponding thread of the threaded rod 15 and the spindle nut 16. This adjustment drive is thus also designed as an immersion spindle drive. The threaded rod 15 is rotationally fixedly coupled to a coupling piece 17. This coupling piece 17 is connected via a hinge 18 to an adjusting lever 19, wherein the coupling piece 17 is held rotationally fixedly relative to the threaded rod 15. The adjusting lever 19 is mounted pivotably in a articulated axle 20 on the retaining part 6 and in a articulated axle 21 on the outer sleeve 5. As a result, it is achieved that pivoting around a pivot axis S of the outer sleeve 5 is carried out relative to the holding part 6 by means of the coupling piece 17 and the threaded rod 15. Thus, in this embodiment of FIG. 5, the supporting unit is formed by the retaining part 6 and the actuating unit is formed by the outer sleeve 5. This adjustment drive for the height adjustment is thus designed as an immersion spindle drive. Alternatively, it is also conceivable and possible to realize the height adjustment with a rotary spindle drive. The adjustment drive 112 is pivotably mounted on the outer sleeve 5. A position sensor unit 22 is provided, which detects the movement of the threaded rod 15 and determines a position of the steering column in the height adjustment direction 101 from the measured signal.

Figure 6:
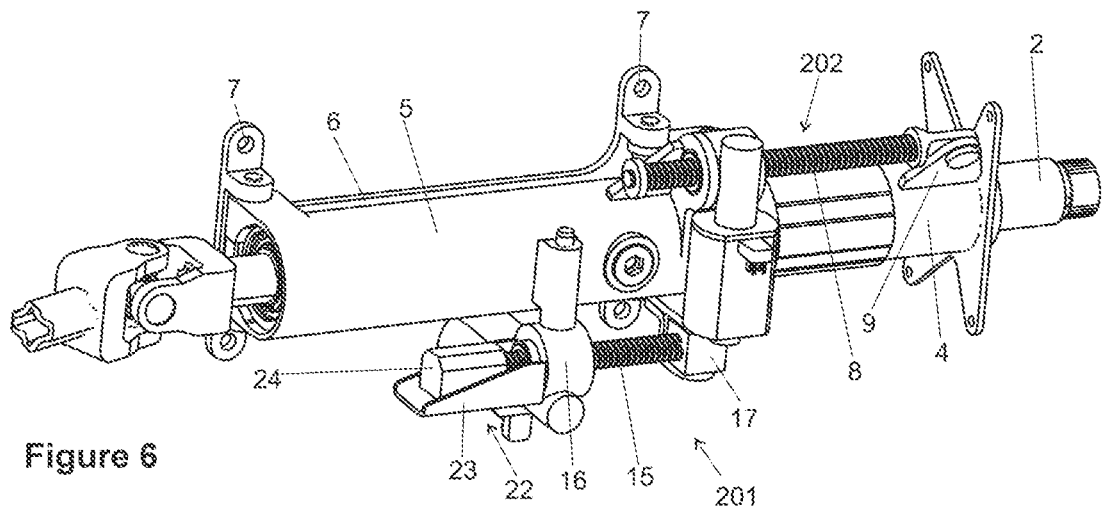
FIG. 6 is another perspective view of the steering column from FIG. 5.

FIG. 6 shows in detail the position sensor unit 22 for height adjustment. Starting from the worm wheel, the threaded rod 15 is surrounded on a first side by the second spindle nut 17 and on a second side by a second element 24 of the position sensor unit 22. The second element 24 of the position sensor unit 22 moves with the end of the threaded rod 15. A first element 23 of the position sensor unit 22 at least partially surrounds the second element 24 and is formed as a U-shaped profile. The first element 23 of the position sensor unit 22 extends parallel to the longitudinal direction of the threaded rod over the adjustment path of the height adjustment device. In addition to the height adjustment device 202, the steering column also has a length adjustment device 201.

The previously described exemplary embodiments have in common that with the help of the position sensor units the position detection devices detect the relative position of the outer shaft or of the sleeve or the actuating unit, respectively, relative to a holding part or the supporting unit, respectively. Preferably, the sensor of the position sensor units is designed as a contactless sensor. Preferably, the sensor is designed as a linear sensor. Particularly preferably, the sensor is designed as an absolute sensor. The sensor may preferably be formed as an inductive, magnetic, optical, acoustic, or capacitive sensor. There may generally be two independent sensors to form a redundant system, which increases reliability. Preferably, these two sensors have different measurement methods.

Preferably, a sensor for determining the length adjustment position and/or a sensor for determining the height adjustment position are provided.

The adjustment speed can also be calculated from the position signal. In the case of stowable steering columns, there is a risk that the driver or an obstacle will block the adjustment and thus will be injured or damaged. Obstacles in the adjustment path of the steering column result in a decrease in the adjustment speed, which can be detected with the position detection device. The signal detection is thus carried out directly at the adjustment device and not indirectly via a gearbox on the adjustment motor. If a decrease of the adjustment speed and undershooting a limit value of the adjustment speed is detected, the adjustment is preferably stopped. Thus, a collision can be detected during adjustment in a simple and effective way and damage can be prevented.

Figure 7:
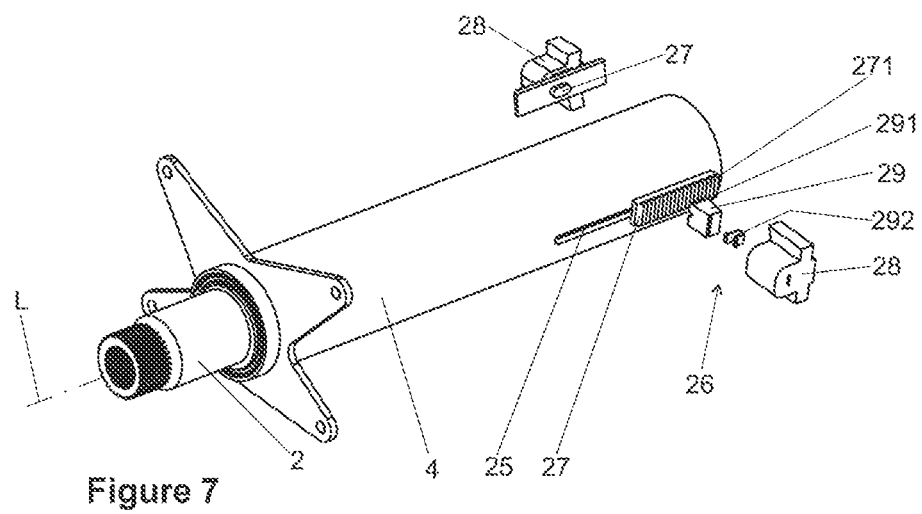
FIG. 7 is a perspective view of a steering column with an energy absorption device for a crash situation.

FIG. 7 shows an inner sleeve 4 of a steering column with two elongated holes 25, which are arranged parallel to the longitudinal direction L and in the circumferential direction on opposite sides of the inner sleeve 4. The elongated holes 25 are part of an energy absorption device 26. A sliding block 27, which is held in a fixed position, the width of which is greater than the width of the elongated holes 25, extends into each of the elongated holes 25, which are therefore widened in the event of a displacement relative to the sliding block 27. The sliding block 27 has toothing 271 on the side turned away from the elongated hole 25. The sliding block 27 is connected to an activation unit 28 via a locking element 29 with toothing 291 corresponding to the toothing 271. If the energy absorption device 26 is active and there is a movement of the inner sleeve 4 in the longitudinal direction L, a deformation of the inner sleeve 4 is caused by the movement of the sliding block 27 in the elongated hole 25, whereby a part of the energy introduced is absorbed, i.e. is converted into deformation work and heat. The activation unit 28 comprises a pyroelectric switch, which is ignited for the activation or setting into operation of the energy absorption device 26, whereby the movement of the locking element 29 is released and the locking element 29 is transferred into an engagement position by means of the pre-stressed spring 292, so that the toothing 291 of the locking element 29 is brought into engagement with the toothing 271 of the sliding block 27.

The inner sleeve 4 is part of a steering column, which has a height adjustment and/or a length adjustment. A previously described position detection device detects the position of the steering column or the position of the actuating unit relative to the supporting unit. Depending on the position of the steering column, the energy absorption device is activated. Preferably, a pyro switch or a lifting magnet can be used for activating the energy absorption devices. At least two energy-absorption devices may be provided, as shown in FIG. 7, wherein in the event of a crash the position of the actuating unit or of the outer shaft 206 is determined relative to the holding part (supporting unit) and at least one of the energy absorption devices is put into operation by means of a control unit according to this position.

Figure 8:
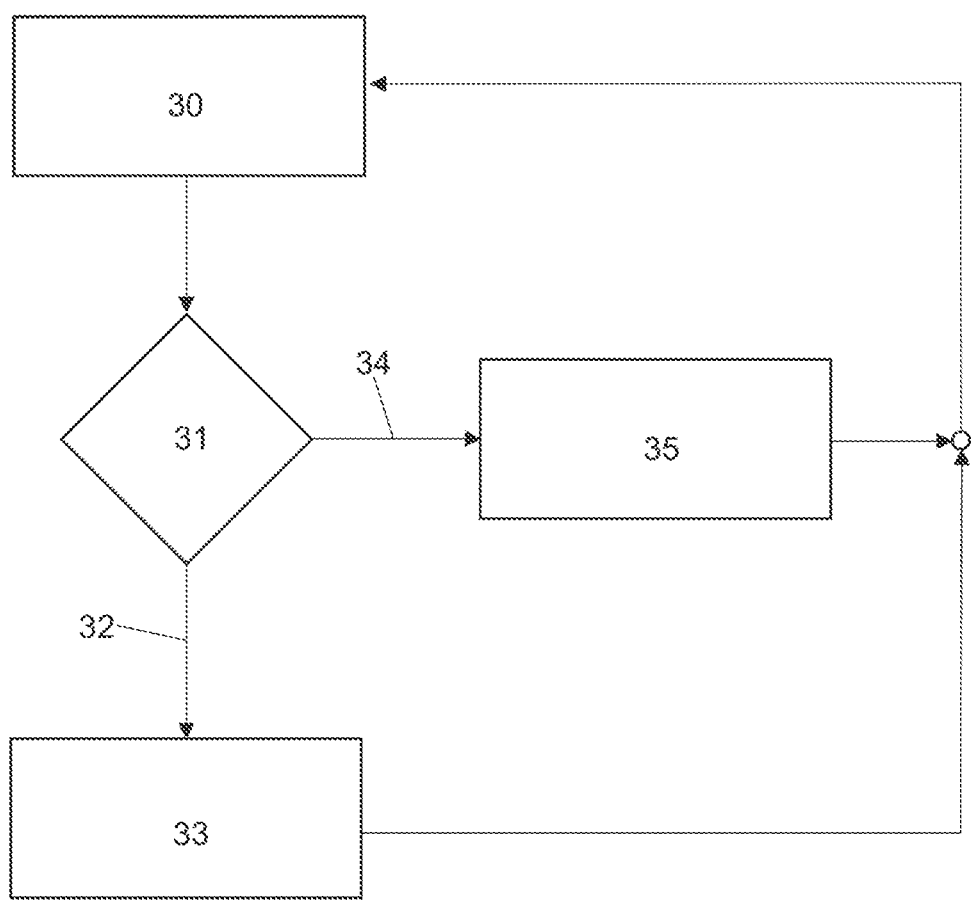
FIG. 8 is a flowchart for controlling a steering system in the event of a crash.

FIG. 8 shows a flowchart in which the energy management is adjusted depending on the position or setting of a steering column, in other words the energy absorption device or energy absorption apparatus is activated depending on the position of the actuating unit relative to the supporting unit. The steering column may preferably be a stowable steering column, which is preferably used in autonomously driving motor vehicles, but the method according to the invention is not limited to this. The stowable steering column can be fully retracted in an autonomous driving mode or placed in a stowed position, so that the steering wheel in the interior is not annoying for the driver. The driver gets more space for other activities.

Such a stowable steering column therefore has a significantly larger adjustment path compared to a conventional adjustment to increase manual driving comfort. Depending on where the steering wheel is located and depending on the position of the steering column, other prerequisites are specified, for example, for an energy absorption device on the steering column and for an airbag systems integrated into the steering wheel. In order to protect the driver in an autonomous driving mode and in a manual driving mode, specific airbag systems are required, which optimally protect the driver with the steering wheel both retracted and extended. The energy management of the steering column is therefore preferably adapted to the position of the steering column in order to take into account the different requirements. It may be provided to activate different airbag systems depending on the steering wheel position.

In a first step, the previously described position detection device measures the position of the steering column in the height adjustment direction and/or the length adjustment direction 30 by means of position sensor units. This information is used to determine whether the steering column is in a driver mode 31, i.e. the driver can grab the steering wheel to control the vehicle in a manual or semi-autonomous driving mode and can initiate a steering command. The position corresponds to a comfort position for the driver and does not include stowed positions, in which the steering wheel is difficult to operate.

If a driver mode position is specified 32, a conventional setting of the energy absorption devices (for example an energy absorption device on the steering column, airbags, and the like) is chosen, which corresponds to the setting of a manual and/or semi-autonomous driving vehicle 33. If, on the other hand, the steering column is in a stowed position 34, the energy absorption device is adjusted according to the situation and a setting 35 is selected which is optimal for the case of a crash. It is conceivable that there are several energy absorption devices on the steering column, which are then addressed depending on the position of the steering column and are put into operation or out of operation.

In order to activate specific airbag systems for the different steering wheel positions, the control unit of the vehicle must always be supplied with information signals regarding the position of the steering wheel or the steering column or, more precisely, with information signals regarding the position of the actuating unit relative to the supporting unit. This means for the steering column, that at least the length adjustment position can be reliably detected and sent to the vehicle. Due to the safety-dependent function, the position detection comes under the classification of functional safety (ASIL). Even after a short-term power failure, the system must be able to detect the exact position of the steering column without moving to the end stops using an initialization process. The position sensor units therefore preferably each comprise an absolute sensor, which can reliably detect and reproduce the position at any time.

What is claimed is:

1. A steering column for a motor vehicle, comprising:
a supporting unit that is configured to be connected to the motor vehicle, and
an actuating unit that is mounted on the supporting unit,
a steering shaft rotatably supported by the supporting unit, wherein the actuating unit is configured to be adjusted relative to the supporting unit, and
a redundant system having two mutually independent position sensor units configured to determine the position of the actuating unit relative to the supporting unit and for measuring the position of the steering column, and wherein
the steering column includes a first adjustment drive for adjusting the actuating unit relative to the supporting unit in a first adjustment direction or a second adjustment drive for adjusting the actuating unit relative to the supporting unit in a second adjustment direction, and wherein the position sensor units are configured to detect adjustment of the actuating unit in the first adjustment direction relative to the supporting unit along a first adjustment path and/or in the second adjustment direction relative to the supporting unit along a second adjustment path continuously over at least 80% of the corresponding adjustment path.

2. The steering column of claim 1, wherein the redundant system having two mutually independent position sensor units comprises at least one position sensor unit which has a first element and a second element interacting therewith, wherein the first element moves relative to the second element during the adjustment of the actuating unit in the first adjustment direction relative to the supporting unit along the first adjustment path and/or in the second adjustment direction relative to the supporting unit along the second adjustment path.

3. The steering column of claim 2, wherein the first element and the second element are linearly movable relative to each other.

4. The steering column of claim 2, wherein the at least one position sensor unit comprises a contactless sensor.

5. The steering column of claim 1, wherein the steering column further comprises: an adjustment drive configured to adjust the actuating unit relative to the supporting unit in a length adjustment direction and/or an adjustment drive configured to adjust the actuating unit relative to the supporting unit in a height adjustment direction, wherein the adjustment drive has a threaded rod with an external thread that engages an internal thread of a spindle nut of the adjustment drive.

6. The steering column of claim 2, wherein the at least one position sensor unit has a linear sensor for producing an electrical control signal depending on the relative position of the first element relative to the second element.

7. The steering column of claim 2, wherein the at least one position sensor unit comprises an absolute sensor.

8. The steering column of claim 2, wherein the at least one position sensor unit comprises an inductive, magnetic, optical, acoustic, or capacitive sensor.

9. The steering column of claim 1, wherein the two redundant position sensor units have different measuring methods.

10. A method for operating a steering column, the steering column having a supporting unit that can be connected to the chassis of the motor vehicle and an actuating unit mounted on the supporting unit and which supports a steering shaft for rotation, wherein the actuating unit can be adjusted relative the supporting unit by means of a motorized adjustment drive, wherein the steering column includes a first adjustment drive for adjusting the actuating unit relative to the supporting unit in a length adjustment direction and/or a second adjustment drive for adjusting the actuating unit relative to the supporting unit in a height adjustment direction, the method comprising:

determining a position of the actuating unit relative to the supporting unit by means of a redundant system having two mutually independent position sensor units;

calculating an adjustment speed from the determined position; and when the adjustment speed falls below a predetermined limit value, stopping the adjustment of the steering column, and wherein the control of the first adjustment drive and the second adjustment drive includes the following procedure steps:

determining an energization of the first and/or the second adjustment drive, checking whether a predetermined limit of the energization is exceeded, if the limit of the energization is exceeded, stopping the adjustment of the steering column;

wherein the determination of the energization includes determination of an electrical current by an ampere meter.

11. The method of claim 10, further comprising:

determining the energization of the first and/or the second adjustment drive, checking whether the predetermined limit of the energization is exceeded, and when the limit value is exceeded, stopping the adjustment of the steering column.

* * * * *